United States Patent [19]

Mizutome et al.

[11] Patent Number: 5,754,153
[45] Date of Patent: May 19, 1998

[54] DISPLAY APPARATUS

[75] Inventors: Atsushi Mizutome, Fujisawa; Hiroshi Inoue, Yokohama; Katsuhiro Miyamoto, Isehara, all of Japan

[73] Assignee: Canon Kabushiki Kaisha, Tokyo, Japan

[21] Appl. No.: 417,846

[22] Filed: Apr. 6, 1995

Related U.S. Application Data

[63] Continuation of Ser. No. 61,508, May 14, 1993, abandoned, which is a continuation of Ser. No. 680,360, Apr. 4, 1991, abandoned.

[30] Foreign Application Priority Data

Apr. 6, 1990 [JP] Japan ................................ 2-091413
Apr. 13, 1990 [JP] Japan ................................ 2-098915

[51] Int. Cl.$^6$ .................................................... G09G 3/36
[52] U.S. Cl. .......................................... 345/97; 345/101
[58] Field of Search ................................ 340/171, 799; 345/87, 94, 95, 96, 97, 99, 100, 101, 98, 200, 201

[56] References Cited

U.S. PATENT DOCUMENTS

| | | | |
|---|---|---|---|
| 4,119,842 | 10/1978 | Hayden et al. | 250/201 |
| 4,655,561 | 4/1987 | Kanbe et al. | 350/350 S |
| 4,665,501 | 5/1987 | Saldin et al. | 340/717 |
| 4,803,476 | 2/1989 | Knapton et al. | 340/814 |
| 4,839,638 | 6/1989 | Kosler et al. | 340/780 |
| 4,842,371 | 6/1989 | Yasuda et al. | 340/784 |
| 4,902,107 | 2/1990 | Tsuboyama et al. | 340/784 |
| 4,922,241 | 5/1990 | Inoue et al. | 340/784 F |
| 4,952,032 | 8/1990 | Inoue et al. | 350/350 S |
| 4,990,902 | 2/1991 | Zenda | 340/771 |
| 4,990,904 | 2/1991 | Zenda | 340/771 |
| 5,041,821 | 8/1991 | Onitsuka et al. | 340/784 |
| 5,049,865 | 9/1991 | Nakamura et al. | 340/784 |
| 5,091,723 | 2/1992 | Kanno et al. | 345/94 |
| 5,122,791 | 6/1992 | Gibbons et al. | 340/784 |
| 5,153,574 | 10/1992 | Kondo | 340/799 |

FOREIGN PATENT DOCUMENTS

| | | |
|---|---|---|
| 0149899 | 7/1985 | European Pat. Off. . |
| 0285402 | 10/1988 | European Pat. Off. . |
| 0303343 | 2/1989 | European Pat. Off. . |
| 0316774 | 5/1989 | European Pat. Off. . |
| 0355693 | 2/1990 | European Pat. Off. . |
| 0359234 | 3/1990 | European Pat. Off. . |
| 0414988 | 3/1991 | European Pat. Off. . |

*Primary Examiner*—Steven Saras
*Attorney, Agent, or Firm*—Fitzpatrick, Cella, Harper & Scinto

[57] ABSTRACT

A display apparatus comprises a display panel having scan and information signal electrodes arranged in a matrix, and a liquid crystal having a memory function and temperature dependency for causing a change in characteristics thereof, with the liquid crystal being arranged between the scan and information signal electrodes. A driver applies a scan signal to the scan signal electrode and an information signal to the information signal electrode, an image information stores image information to be displayed on the display panel, a display mode storer stores a display mode of the image information to be displayed on the display panel, and a scan mode storer stores a scan mode corresponding to temperature information of the display panel. In addition, a drive condition controller controls the drive conditions of the display panel in accordance with an environmental temperature, and a display controller reads out target information from the image information storing means, controls the drive condition control means in accordance with the display mode stored in the display mode storer and the scan mode stored in the scan mode storer, and displays the target image information on the display panel.

5 Claims, 15 Drawing Sheets

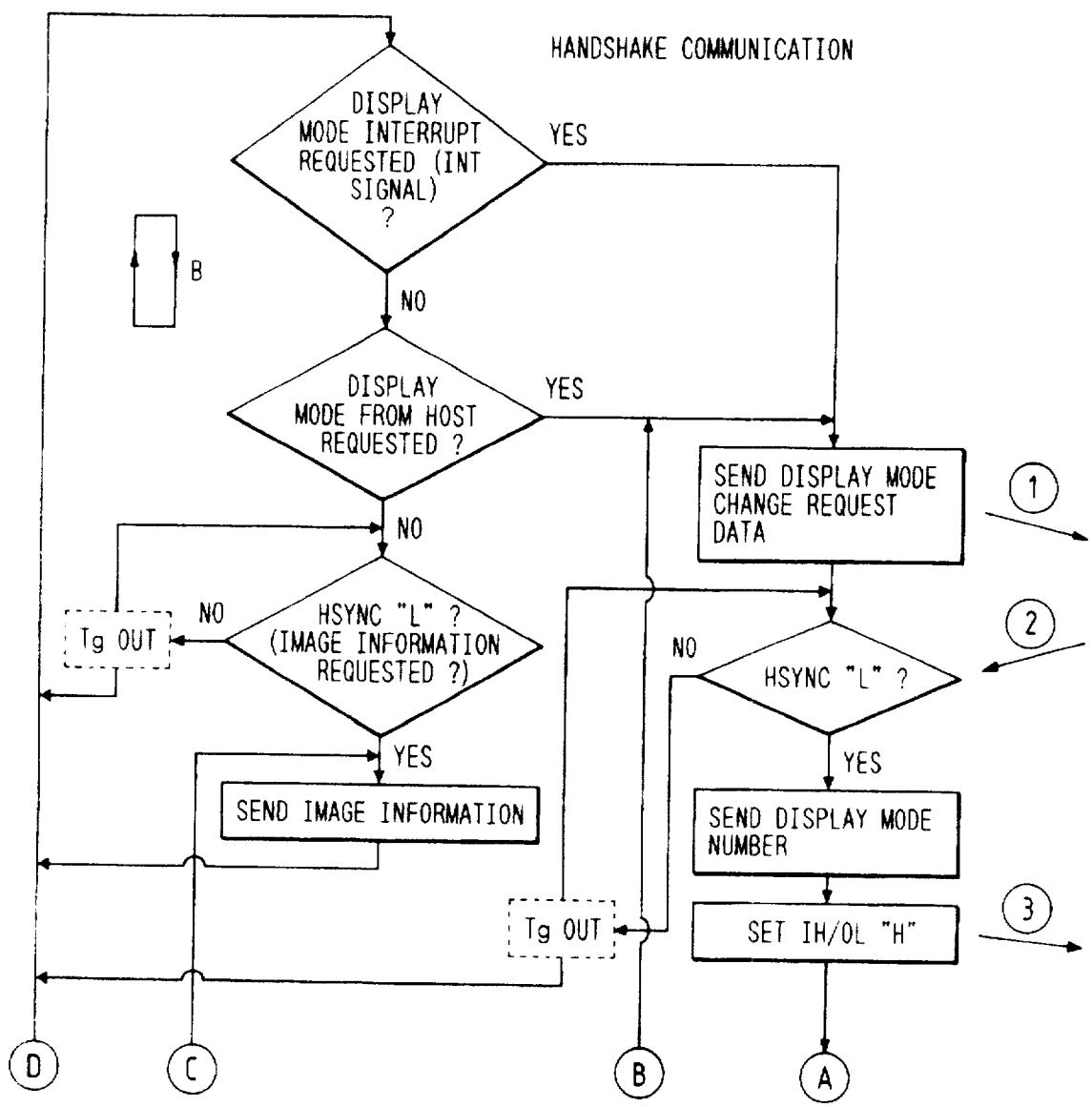

FIG. 7

TABLE 1      SPECIFICATION OF MULTISYNC 4D AND 5D

PREVIOUSLY PROGRAMED DISPLAY MODE IN MEMORY:

| HOR. SCAN FREQUENCY | VER. SCAN FREQUENCY | COLOR | TYPE OF ADAPTOR | PIXEL NUMBER |
|---|---|---|---|---|
| 30.4 KHz | 60 Hz | Unlimited | IBM PGC | 640×480 |
| 31.5 KHz | 60/70 Hz | Unlimited | IBM MCGA, VGA | 640×480 |
| 35.0 KHz | 66.7 Hz | Unlimited | Machintosh II Video Card | 640×480 |
| 35.2 KHz | 56.0 Hz | Unlimited | Super VGA | 800×600 |
| 35.5 KHz | 43.5 Hz | Unlimited | IBM 8514/A (Interlaced) | 1024×768 |
| 48.0 KHz | 60/70 Hz | Unlimited | 1024×768 (Non-interlaced) | 1024×768 |
| 64.0 KHz | 60 Hz | Unlimited | 1280×1024 (Non-interlaced) | 1280×1024 |

FIG. 8

TABLE 2   SUPPORT MODE TABLE (IBM MODE)

1. ALPHANUMERIC MODE

| MODE | ADAPTER | CHARACTERS | PIXELS | CHAR-SIZE | COLOR | B/P | PAGES | RATIO |
|---|---|---|---|---|---|---|---|---|
| 0.1 | VGA(CGA) | 40×25 | 320×200 | 8×8 | 16 | 4 | 8 | 1.2.4 |
| 0*.1* | VGA(350) | 40×25 | 320×350 | 8×14 | 16/64 | 4 | 8 | 1.2 |
| 0+.1+ | VGA(400) | 40×25 | 360×400 | 9×16 | 16/256 | 4 | 8 | 1.2 |
| 2.3 | VGA(CGA) | 80×25 | 640×200 | 8×8 | 16 | 4 | 8 | 1.2 |
| 2*.3* | VGA(CGA) | 80×25 | 640×350 | 8×14 | 16/64 | 4 | 8 | 1.2 |
| 0+.1+ | VGA(CGA) | 80×25 | 720×400 | 9×16 | 16/256 | 4 | 8 | 1 |
| 7* | VGA(350) | 80×25 | 720×350 | 9×14 | mono | 1 | 8 | 1 |
| 7+ | VGA(400) | 80×25 | 720×400 | 9×16 | mono | 1 | 8 | 1 |

2. GRAPHICS MODE

| MODE | ADAPTER | RESOLUTION | COLOR | B/P | CHAR-SIZE | RATIO |
|---|---|---|---|---|---|---|
| 4.5 | VGA(CGA) | 320×200 | 4 | 2 | 8×8 | 1.2.4 |
| 6 | VGA(CGA) | 640×200 | 2 | 1 | 8×8 | 1.2 |
| D | VGA(CGA+) | 320×200 | 16 | 4 | 8×8 | 1.2.4 |
| E | VGA(CGA+) | 640×200 | 16 | 4 | 8×8 | 1.2 |
| F | VGA(EGA) | 640×350 | 4 | 2 | 8×14 | 1.2 |
| 10 | VGA(EGA+) | 640×350 | 16 | 4 | 8×8 | 1.2 |
| 11 | VGA | 640×480 | 2 | 1 | 8×16 | 1.2 |
| 12 | VGA | 640×480 | 16 | 4 | 8×16 | 1.2 |
| 13 | VGA | 320×200 | 256 | 8 | 8×8 | 1.2.4 |

NUMERICAL NUMBERS (1.2.4) OF RATIO REPRESENT DISPLAYABLE TONE NUMBER IN FLCD.
1→4 LEVELS, 2→8 LEVELS, AND 4→16 LEVELS.

FIG. 10A

0 - 1 - 2 - 3 - 4 -    - 1022 - 1023    1st FRAME

0 - 1 - 2 - 3 - 4 -    - 1022 - 1023    2nd FRAME

FIG. 10B

SCAN ORDER OF ONE FRAME

| FIELD | SELECTED SCAN LINE | FIELD | SELECTED SCAN LINE |
|---|---|---|---|
| 1 | $32n+0$ | 17 | $32n+24$ |
| 2 | $32n+13$ | 18 | $32n+1$ |
| 3 | $32n+26$ | 19 | $32n+18$ |
| 4 | $32n+3$ | 20 | $32n+27$ |
| 5 | $32n+16$ | 21 | $32n+12$ |
| 6 | $32n+9$ | 22 | $32n+5$ |
| 7 | $32n+30$ | 23 | $32n+22$ |
| 8 | $32n+19$ | 24 | $32n+31$ |
| 9 | $32n+4$ | 25 | $32n+8$ |
| 10 | $32n+25$ | 26 | $32n+17$ |
| 11 | $32n+10$ | 27 | $32n+2$ |
| 12 | $32n+7$ | 28 | $32n+23$ |
| 13 | $32n+28$ | 29 | $32n+20$ |
| 14 | $32n+21$ | 30 | $32n+29$ |
| 15 | $32n+6$ | 31 | $32n+14$ |
| 16 | $32n+15$ | 32 | $32n+11$ |

$(n=0, 1, 2, 3 \ldots \ldots 31)$

FIG. 10C

BLOCK STRUCTURE

| BLOCK NUMBER | SCAN LINE NUMBER | 1st FIELD SELECTED SCAN LINE | 2nd FIELD SELECTED SCAN LINE |
|---|---|---|---|
| 1 | 0~63 | $2n$ | $2n+1$ |
| 2 | 64~127 | $2n+1$ | $2n$ |
| 3 | 128~191 | $2n$ | $2n+1$ |
| 4 | 192~255 | $2n+1$ | $2n$ |
| 5 | 256~319 | $2n$ | $2n+1$ |
| 6 | 320~383 | $2n+1$ | $2n$ |
| 7 | 384~447 | $2n$ | $2n+1$ |
| 8 | 448~511 | $2n+1$ | $2n$ |
| 9 | 512~575 | $2n$ | $2n+1$ |
| 10 | 576~639 | $2n+1$ | $2n$ |
| 11 | 640~703 | $2n$ | $2n+1$ |
| 12 | 704~767 | $2n+1$ | $2n$ |
| 13 | 768~831 | $2n$ | $2n+1$ |
| 14 | 832~895 | $2n+1$ | $2n$ |
| 15 | 896~959 | $2n$ | $2n+1$ |
| 16 | 960~1023 | $2n+1$ | $2n$ |

($n = 0, 1, 2, 3, \ldots \ldots 31$)

SCAN WITHIN BLOCK (2 INTERLACE SCAN)

```
|-- 1st BLOCK --|  |-- 2nd BLOCK --|
0 -  2  -  4  -       - 62 - 65 - 67 - 69 -      - 1023   1st FIELD
1 -  3  -  5  -       - 63 - 64 - 66 - 68 -      - 1022   2nd FIELD
                                                 (ONE FRAME SCAN END)
```

FIG. 10D

BLOCK STRUCTURE

| BLOCK NUMBER | SCAN LINE NUMBER | 1st FIELD SELECTED SCAN LINE | 2nd FIELD SELECTED SCAN LINE | 3rd FIELD SELECTED SCAN LINE | 4th FIELD SELECTED SCAN LINE |
|---|---|---|---|---|---|
| 1 | 0~127 | 4n | 4n+2 | 4n+1 | 4n+3 |
| 2 | 128~255 | 4n+1 | 4n+3 | 4n+2 | 4n |
| 3 | 256~383 | 4n+2 | 4n | 4n+3 | 4n+1 |
| 4 | 384~511 | 4n+3 | 4n+1 | 4n | 4n+2 |
| 5 | 512~639 | 4n | 4n+2 | 4n+1 | 4n+3 |
| 6 | 640~767 | 4n+1 | 4n+3 | 4n+2 | 4n |
| 7 | 768~895 | 4n+2 | 4n | 4n+3 | 4n+1 |
| 8 | 896~1023 | 4n+3 | 4n+1 | 4n | 4n+2 |

$(n=0, 1, 2, 3, \ldots 31)$

SCAN WITHIN BLOCK (4 INTERLACE SCAN)

```
|--  1st BLOCK  --|    |--  2nd BLOCK  --|
|- 0 -- 4 -- 8 -|      |- 129 -- 133 -|      -- 1023    1st FIELD
|- 2 -- 6 --10 -|      |- 131 -- 135 -|      -- 1021    2nd FIELD
|- 1 -- 5 -- 9 -|      |- 130 -- 134 -|      -- 1020    3rd FIELD
|- 3 -- 7 --11 -|      |- 128 -- 132 -|      -- 1022    4th FIELD
              |- 127 -|                              (ONE FRAME SCAN END)
```

5,754,153

DISPLAY APPARATUS

This application is a continuation of application Ser. No. 08/061,508, filed May 14, 1993, which is a continuation of application Ser. No. 07/680,360, filed Apr. 4, 1991, now both abandoned.

BACKGROUND OF THE INVENTION

1. Field of the Invention

The present invention relates to a method of controlling a display apparatus and, more particularly, to a control method of displaying video information on a liquid crystal display apparatus driven upon application of a scan signal and an information signal, the liquid crystal display apparatus having scan and information signal lines sandwiched between matrix electrodes, a memory function, and temperature dependency in drive conditions.

2. Related Background Art

The sizes of display screens and the resolutions of display apparatuses such as liquid crystal display apparatuses required in a personal computer, a workstation, and the like have been increased in recent years. At the same time, compatibility with conventional apparatuses is also required for these display apparatuses. An IBM PC/AT personal computer is considered as an example. This personal computer has ten or more display modes by CGA, EGA, VGA, 8514/A, and the like as image adapter specifications. These display modes have different resolutions and different numbers of displayable colors.

Typical products capable of displaying many display modes on single displays are exemplified by a MultiSync II CRT and MultiSync 3D, 4D, and 5D CRTs, all of which are available from NEC CORP. Video modes (display modes) supported by the MultiSync 4D and 5D CRTs are shown in Table 1.

A display apparatus having a memory function, such as a ferroelectric liquid crystal (FLC) display apparatus has a basic operation principle different from those used in conventional display apparatuses such as a CRT, an STN-LCD (Super Twisted Liquid Crystal Display), and a PDP (Plasma Display). Kanbe et al. propose drive schemes suitable for FLC display apparatuses in U.S. Pat. No. 4,655,561 and the like.

In order to satisfactorily support the above-mentioned various display modes using this FLC display apparatus, no conventional method can be used due to a new drive principle. A systematic control method must be inevitably proposed to use one of the various display modes upon a power-on operation and to change this display mode to another mode as needed.

For example, an overall arrangement for supporting various display modes of an IBM PC/AT machine and a fine mode of 1,280×1,024 by using an FLC display apparatus, and its control method are proposed as follows.

An FLC display apparatus as a typical example of a display apparatus having a memory function has temperature dependency in drive conditions represented in FIG. 3. In this example, frame frequencies at 10° C., 25° C., and 40° C. are 7 Hz, 10 Hz, and 20 Hz, respectively (number of scan lines: 1,024 ; drive voltage: 24 V; use of KMT-408 available from Nihon Chisso). When the arrangement has a temperature of 10° C. at the time of a power-ON operation, flickering can be prevented by an 8 interlace scan at a low frequency, as proposed in the above prior-art invention. When an environmental temperature of a display panel is, however, increased with the start of operation, e.g., when heating by a back light ON state or forcible use of an external heater causes a temperature rise to 25° C., flickering can be prevented by a 4 interlace scan. A screen discontinuation phenomenon of a display screen in a motion image display mode, e.g., in a scroll display, which is the only drawback in the 8 interlace scan, can be reduced. A drive method varies depending on different display modes even when the temperature is kept unchanged. For example, an FLC display operated at 10 Hz in a display mode having 1,024 scan lines in Table 1 is changed to have 480 scan lines in a VGA mode, and the frame frequency is increased to 20 Hz or more. In this case, flickering can be sufficiently prevented by the normal (2) interlace scan. At the same time, the image discontinuation phenomenon in the motion image display mode can be reduced. Although a conventional method of determining a display mode is available, no conventional method can change the frame frequency of a display in accordance with the environmental temperature of a display panel.

In addition, since an FLC display is an X-Y matrix display, the number of pixels cannot be changed in different display modes by a simple method such as changing the beam frequency. The number of physical pixels of an X-Y matrix display is determined uniquely during the manufacture and cannot be changed. For this reason, the number of logical pixels required in each display mode must be converted into the number of physical pixels.

When colors to be displayed on a display, the gradation level number, and input information do not coincide with each other, for example, when the display has a monochrome 8-level display mode, while input information represents an RGB 256-level (each color component R, G, or B is represented by one of 256 levels) display mode, a relationship in color and gradation level number between the input information and the output information must be determined in a one-to-one correspondence with a display mode.

When drive conditions of an FLC display are not satisfied, e.g., when an environmental temperature does not reach a temperature range of a display operation, the display sends a "wait" request to an image information generation side, so that the image information generation side waits before outputting image information. When the display apparatus is reset or when a mode set before a reset operation is performed is to be immediately restored, various control and drive parameters and image information prior to the reset operation must be read out.

Even if means for satisfying the above necessary conditions are prepared, it is preferable for a user to easily change the above drive conditions not only at the time of a power-ON operation but also during an operation in accordance with a predetermined sequence. Otherwise, whenever a display mode is to be changed, the apparatus must be turned off and then on, or be reset.

In particular, when the currently set display mode is to be changed, it is insufficient to set only a new mode. Assume that the VGA mode is currently set and that the currently set mode is to be changed to an EGA mode in response to an application software request. The previous display mode cannot be restored at the end of this application software if the various FLC display control parameters of the previous display mode are not saved in a given memory area. The previous image information must often be loaded in a memory. The FLC display control and drive parameters and original image data prior to its conversion to image data on the FLC display must be read by predetermined programming.

In order to obtain a computer product with an FLC display satisfying the above necessary conditions, a ROM (to be referred to as a ROM BIOS) for storing the necessary conditions of this product must be prepared. This ROM BIOS actually controls an interface associated with control and display of the computer side and the FLC side. The user can control display modes without having any specialized technical knowledge for controlling and driving an FLC display.

Two problems, however, are posed when a display panel is controlled and driven by a ROM BIOS program for controlling communication.

One problem occurs when the host CPU causes application software to request a display mode and starts controlling the display panel. During this control, when external noise is superposed on a control signal on a control line, or when the control line is open or short-circuited, a program in the ROM BIOS cannot continuously run. As a result, the program in the ROM BIOS cannot perform subsequent control while a display mode change request from the host CPU is received. For example, the program in the ROM BIOS cannot control to transfer image information to the display panel. In this state, since the image information on the display panel cannot be updated, a CPU state cannot be monitored. Since the CPU side is reset to perform a restore operation, all the previously processed data are undesirably broken.

The other problem occurs concurrently with the above state. In this state, the display panel cannot receive image information. Until the normal state is restored from this state, the same image information is left on the display panel. This phenomenon is a long-term after image phenomenon called "burning" on the panel.

In addition, the FLC display apparatus has temperature dependency in drive conditions, as shown in FIG. 3. In this example, frame frequencies at 10° C., 25° C., and 40° C. are 7 Hz, 10 Hz, and 20 Hz, respectively (number of scan lines: 1,024; drive voltage: 24 V; use of KMT-408 available from Nihon Chisso). When the arrangement has a temperature of 10° C. at the time of a power-ON operation, flickering can be prevented by an 8 interlace scan at a low frequency, as proposed in the above prior-art invention. When an environmental temperature of a display panel is, however, increased with the start of an operation, e.g., when heating by a back light ON state or forcible use of an external heater causes a temperature rise to 25° C., flickering can be prevented by a 4 interlace scan. A screen discontinuation phenomenon of a display screen in a motion image display mode, e.g., in a scroll display, which is the only drawback in the 8 interlace scan, can be reduced. A drive method varies depending on different display modes even when the temperature is kept unchanged. For example, an FLC display operated at 10 Hz in a display mode having 1,024 scan lines in Table 1 in FIG. 7 is changed to have 480 scan lines in a VGA mode, and the frame frequency is increased to 20 Hz or more. In this case, flickering can be sufficiently prevented by the normal (2) interlace scan. At the same time, the image discontinuation phenomenon in the motion image display mode can be reduced. Although a conventional method of determining a display mode is available, no conventional method can change a display scan mode (e.g., interlace scan or noninterlace scan) of a display in accordance with the environmental temperature of a display panel.

In order to obtain a computer product with an FLC display satisfying the above necessary conditions, a ROM (to be referred to as a ROM BIOS) for storing the necessary conditions of this product must be prepared. This ROM BIOS actually controls an interface associated with control and display of the computer side and the FLC side. The user can control display modes without having any specialized technical knowledge for controlling and driving an FLC display.

SUMMARY OF THE INVENTION

It is an object of the present invention to provide a display apparatus for solving the conventional problems posed by an operation error during control of a display panel, the problems occurring on the host side or display panel side.

According to the present invention, the first one of the above problems is solved such that a display control means for controlling a drive condition control means in accordance with a display mode stored in a display mode storing means includes means for forcibly interrupting the display control, means for restarting the display control in response to a signal from the drive condition control means, and a means for setting a control interruption timing of the display control means at a predetermined arbitrary time. The second one of the above problems is solved such that the display control means includes means for controlling ON/OFF states of a drive element power source of the drive condition control means and a peripheral unit power source such as a back light required for a display element after the display control is interrupted.

In particular, according to the present invention, there is provided a display apparatus characterized by comprising:

a. a display panel having scan and information signal electrodes arranged in a matrix, and a liquid crystal having a memory function and temperature dependency for causing a change in characteristics thereof, the liquid crystal being arranged between the scan and information signal electrodes;

b. driving means for applying a scan signal to the scan signal electrode and an information signal to the information signal electrode;

c. image information storing means for storing image information to be displayed on a display panel;

d. display mode storing means for storing a display mode of the image information to be displayed on the display panel; and e. display control means for reading out target image information from the image information storing means and controlling a drive means in accordance with a display mode stored in the display mode storing means, the display control means being provided with means for forcibly interrupting control of the display control means and causing the display control means to restart the control after an interruption. Preferably, the display control means comprises an interrupting means for forcibly interrupting the control of the display control means, causing the display control means to restart the control, and arbitrarily setting a start and an end of an interruption, and means for controlling an ON/OFF operation of a power source after the control is interrupted by the interrupting means.

Furthermore, according to the present invention, there is provided a display apparatus comprising:

a. a display panel having scan and information signal electrodes arranged in a matrix, and a liquid crystal having a memory function and temperature dependency for causing a change in characteristics thereof, the liquid crystal being arranged between the scan and information signal electrodes;

b. driving means for applying a scan signal to the scan signal electrode and an information signal to the information signal electrode;

c. image information storing means for storing image information to be displayed on a display panel;

d. display mode storing means for storing a display mode of the image information to be displayed on the display panel;

e. scan mode storing means for storing a scan mode corresponding to temperature information of the display panel;

f. drive condition control means for controlling drive conditions of the display panel in accordance with an environmental temperature; and g. display control means for reading out target image information from the image information storing means, controlling the drive condition control means in accordance with the display mode stored in the display mode storing means and the scan mode stored in the scan mode storing means, and displaying the target image information on the display panel.

BRIEF DESCRIPTION OF THE DRAWINGS

FIGS. 2 and 2A–2D is a flow chart of a display unit controller used in the present invention;

FIG. 7 is a view showing display modes in a CRT display;

FIG. 8 is a view showing Table 2 representing the general functions of various CRT graphics mode support operations complying within IBM standards in the display modes of an FLC display system of the present invention and representing some of FLC display drive conditions;

FIGS. 10A to 10D are views showing specifications (scan orders) of scan modes, respectively.

DETAILED DESCRIPTION OF THE PREFERRED EMBODIMENT

The present invention will be described in detail with reference to a preferred embodiment.

Figure 1:
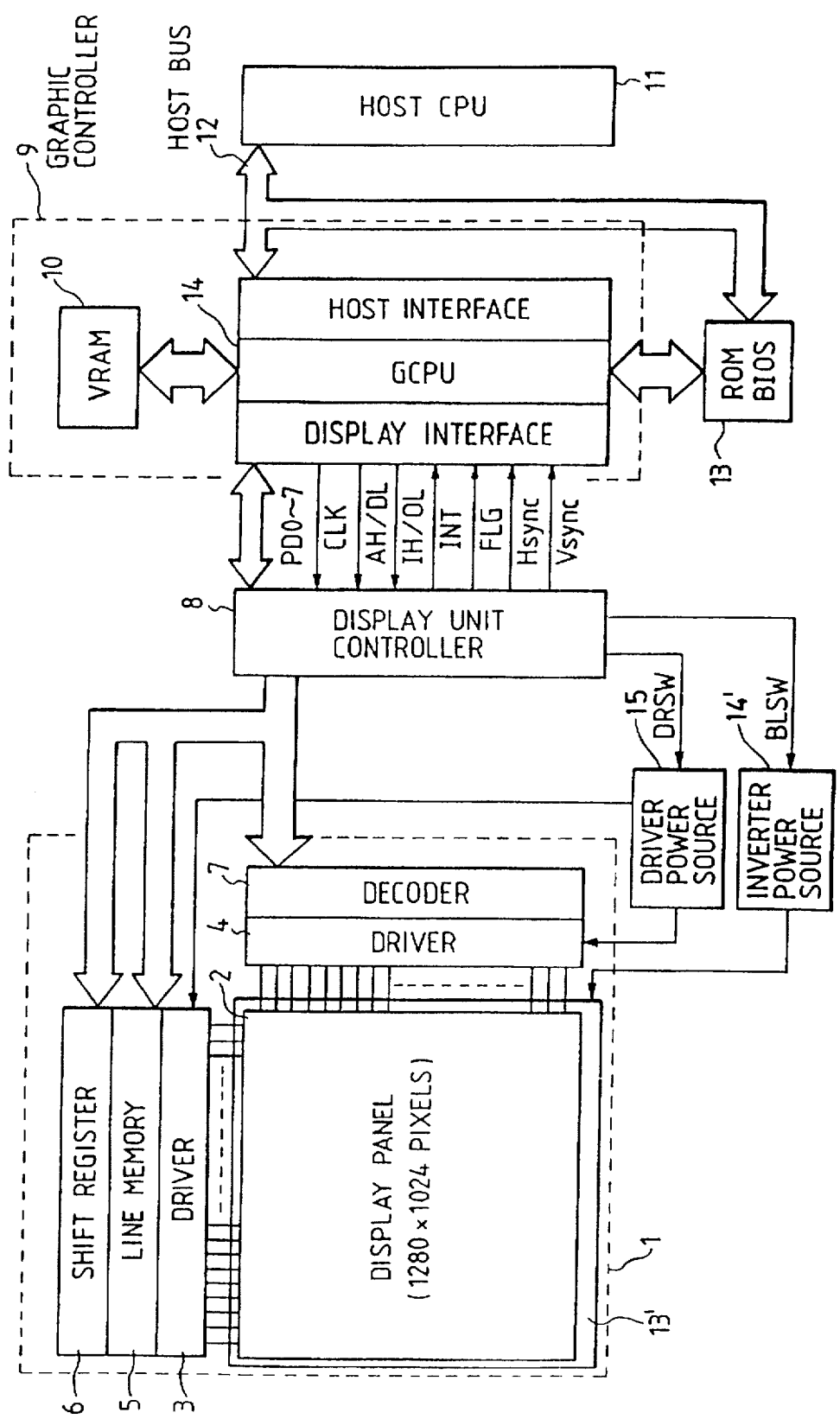
FIG. 1 is a block diagram of a display apparatus according to an embodiment of the present invention.

Referring to FIG. 1, an FLC display apparatus according to an embodiment of the present invention serves as a display panel 2 (1,280×1,024 pixels). A system in FIG. 1 includes display drivers 3 and 4, a display unit controller 8 for storing control programs of the present invention, a graphic controller 9 having a VRAM 10 serving as an image information storage memory, a host CPU 11 representing an IBM PC/AT, and a host bus 12. The system also includes a ROM BIOS 13 for storing an overall control monitor program as a characteristic feature of the present invention, a back light 13' serving as a back light source of the display panel 2, an invertor 14' for supplying power to the back light 13, and a driver power source 15 for supplying power to the display drivers 3 and 4.

(1) Functions of Signal Lines

Functions of signal lines arranged between the host CPU 11 and the graphic controller 9 will be described below.

Host Bus

In an IBM PC/AT machine, the host bus is an IBM standard interface hardware bus called an AT bus.

The functions of signal lines arranged between the FLC display unit controller 8 and the graphic controller 9 in FIG. 1 will be described below.

1) PD0–PD7: 8-bit bidirectional data bus; data transfer speed: 10 MHz/8 bits

2) CLK: Transfer clock: 20 MHz

3) AH/DL: Discrimination signal between drive information and video information; this signal is set at Hi level when it represents drive information and is set at Lo level when it represents video information.

4) IH/OL: Data bus input/output discrimination signal; this signal is set at Hi level when the data bus (PD0–PD7) is set in an input mode when viewed from the graphic controller and is set at Lo level when the data bus is set in an output mode.

5) INT: Interrupt signal from the display apparatus to the graphic controller

6) FLG: Data output enable signal from the display apparatus to the graphic controller; this signal is set at Hi level in an output enable state.

7) Hsync: Horizontal sync signal; this signal serves as a signal for allowing data reception from the display apparatus to the graphic controller.

8) Vsync: Vertical sync signal; this signal serves as a sync signal in units of display screens.

In addition to the above signals,

9) DRSW: This line serves as a control line for controlling ON/OFF control of the display drivers 3 and 4.

10) BLSW: This line serves as a control line for controlling an ON/OFF operation of the invertor power source 14 as a power source for the back light 13.

A basic operation in normal display control will be described below.

(2) Basic Operation

A function defined in the ROM BIOS 13 is called from a video information generation side, i.e., the host CPU 11 side in accordance with a predetermined call rule. A parameter necessary for realizing a desired function is often transferred to the graphic controller 9. On the ROM BIOS 13 side, when the function is called in accordance with a standard sequence, the function is translated by a GCPU (graphics control central processing unit) 14 for realizing the requested function, or the-function signal is directly supplied to the display controller 9.

The content and general operations of the function translation or the direct supply of the function signal will be described below.

The graphic controller 9 transfers drive information and video information to the FLC display unit through the bidirectional data bus (PD0–PD7). Since the drive information and the video information are transferred through the same transmission line, these pieces of information must be discriminated from each other. For this purpose, the discrimination signal AH/DL is used. When the AH/DL signal is set at Hi level, information on the data bus (PD0–PD7) represents "drive information". However, when the AH/DL signal is set at Lo level, information on the data bus (PD0–PD7) represents "video information".

The FLC display unit controller 8 extracts the drive information from the video information with the drive information sent through the data bus (PD0–PD7) and performs processing on the basis of the extracted drive information. On the other hand, the video information is sent to a shift register 6 on the information electrode drive circuit side in response to a transfer clock.

In this embodiment, since a drive display of the FLC display is asynchronous with generation of drive information and video information in the graphic controller 9, the input and output devices must be synchronized at the time of display information transfer. For this purpose, the sync signals Hsync and Vsync are used. The Hsync signal is generated by the FLC display unit controller 8 every horizontal scan period, and the Vsync signal is generated by the FLC display unit controller 8 every vertical scan period during refreshing. The Hsync and Vsync signals are supplied to the graphic controller 9. The graphic controller 9 always monitors these sync signals. When the Vsync signal is set at Hi level and the Hsync signal is set at Lo level, the graphic controller 9 transfers display information (i.e., drive information+video information). Otherwise, the graphic controller 9 waits until the next transfer enable signal is input at the end of each transfer cycle of display information.

Figure 4:
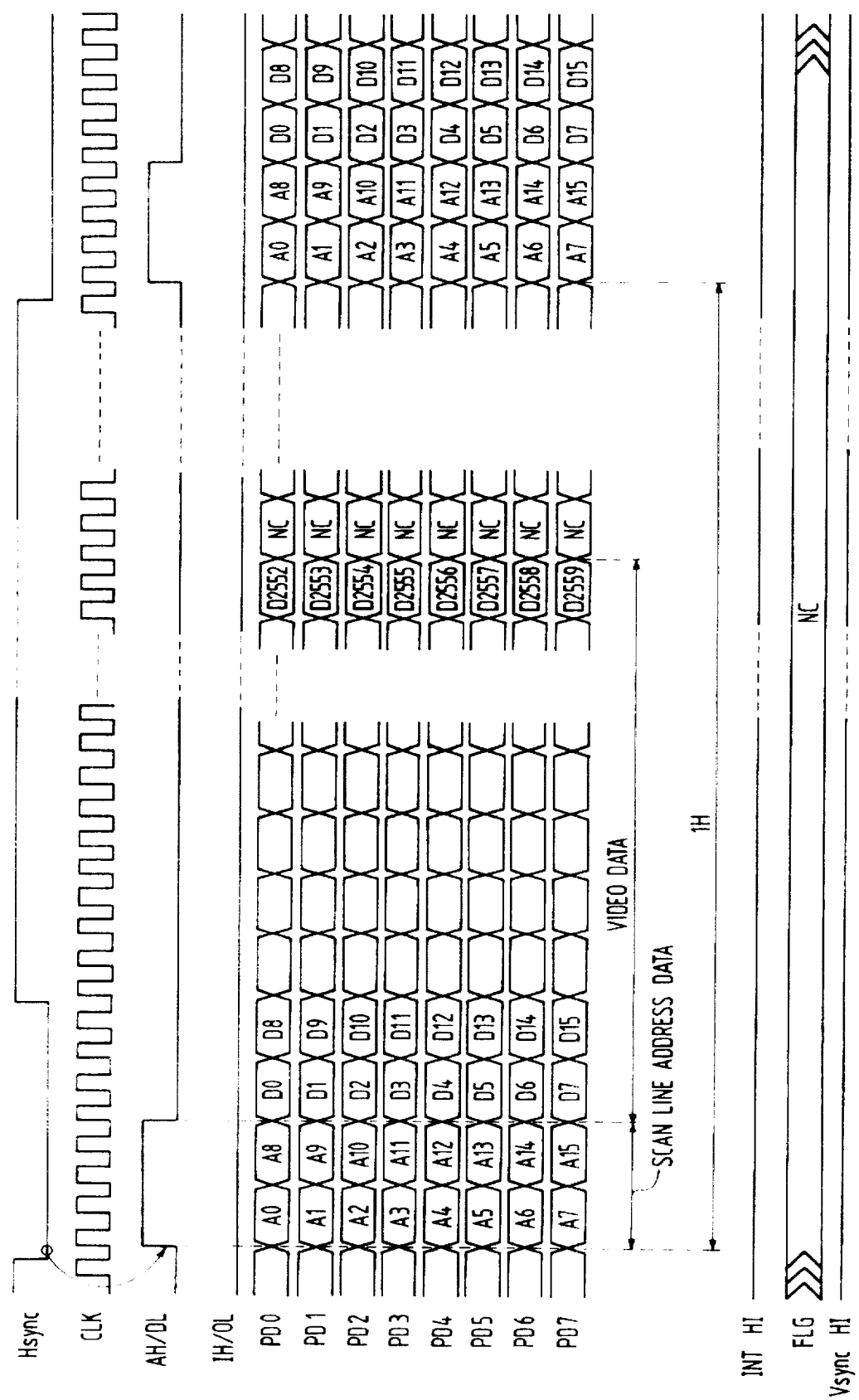
FIGS. 4, 5, and 6 are timing charts of communication schemes used in the present invention.

FIG. 4 is a basic communication timing chart obtained when display information is sent from the graphic controller 9 to the controller 8 of an FLC display unit 1. The basic communication will be described below.

When the graphic controller 9 detects that the Hsync signal goes to Lo level (at the same time INT=Hi & Vsync=Hi & IH/OL=Lo), the graphic controller 9 sets the AH/DL signal to Hi level and starts transfer of the display information. The controller 8 in the FLC display unit 1 sets the Hsync signal to Hi level during the display information transfer period. When a series of operations based on the transferred drive information are completed, the controller 8 in the FLC display unit 1 sets the Hsync signal to Lo level again and is ready for receiving the next display information.

Figure 5:
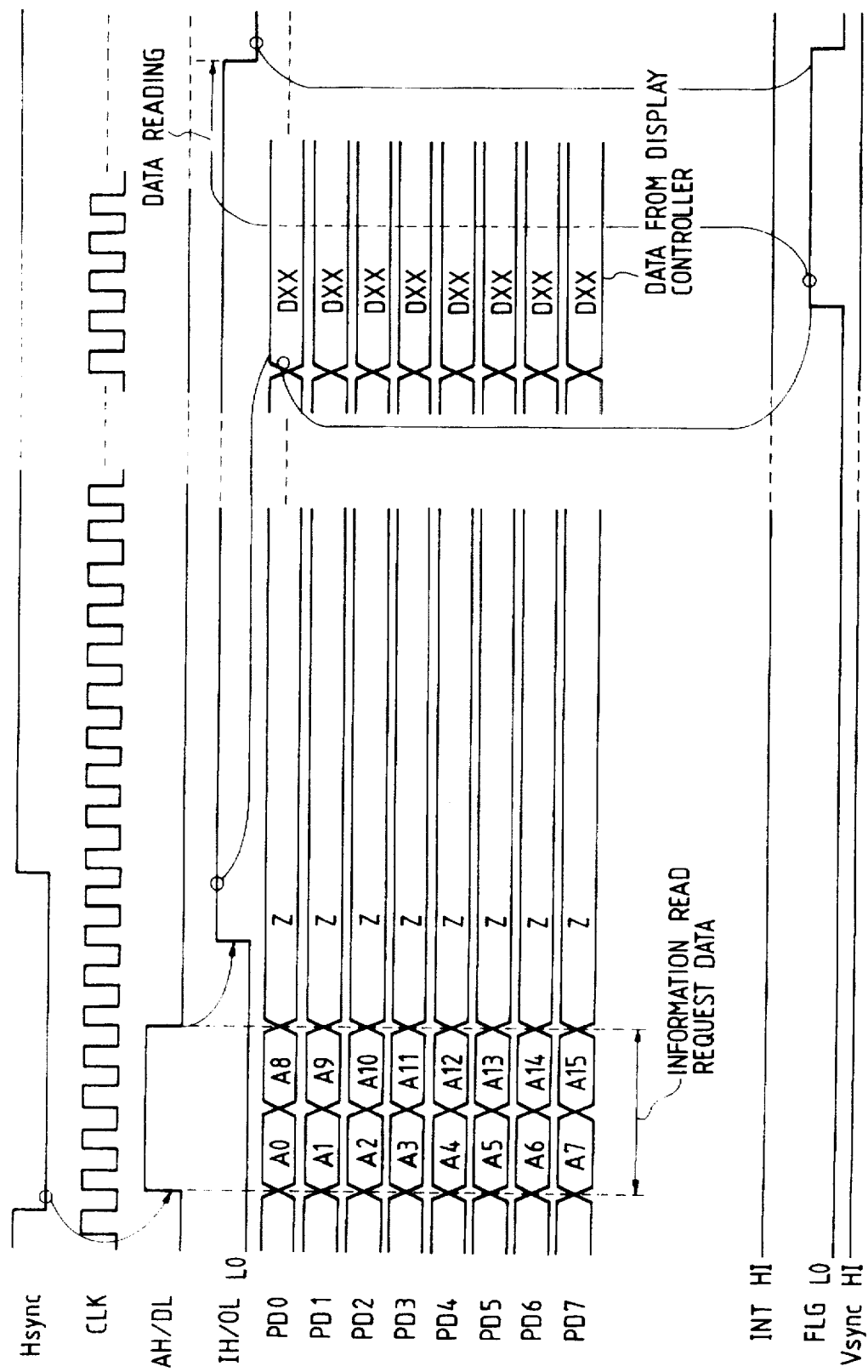

FIG. 5 is a basic communication timing chart for reading out display information from the controller 8 of the FLC display unit 1 by the graphic controller 9. This basic communication will be described below.

The graphic controller 9 sends to the controller 8 of the display unit 1 "information read request data" predetermined between the graphic controller 9 and the controller 8 of the FLC display unit 1 as drive information at timings of A0 to A15 in FIG. 5. The IH/OL signal is set at Hi level to set a data input mode. At this time, the data bus (PD0–PD7) is set in a high-impedance state (Z) viewed from the graphic controller 9. When the controller 8 in the FLC display unit 1 recognizes the "information read request data", it verifies that the IH/OL line is set at Hi level. Information is sent onto the data bus (PD0–PD7), and the FLG signal is set at Hi level. When the graphic controller 9 detects that the FLG line is set at Hi level, the concurrent data on the data bus (PD0–PD7) is loaded and stored in the GCPU 14.

(3) Communication Operation in Video Display

In a video display mode of the display, display information is sent from the graphic controller 9 to the display, and the same communication operation as in FIG. 4 is performed. At this time, scan line address information serves as drive information. The drive information is sent onto A0 to A15 in FIG. 4 and is transferred to the display controller 8.

More specifically, the scan line address information is extracted by the controller 8 in the FLC display unit and is input to a scan line electrode drive circuit decoder 7 in synchronism with a timing for driving a designated scan line, thereby selecting a display-designated scan line. On the other hand, the video information is transferred to the information electrode drive circuit shift register 6 and is shifted by a transfer clock (CLK) in units of eight pixels. When a shift operation of one horizontal scan line is completed by the shift register 6, video information of 1,280 pixels is transferred to a line memory 5 and is kept stored during one horizontal scan period. When a predetermined one horizontal scan period elapses and a write operation of the display panel 2 is completed, the controller 8 in the display unit 1 sets the Hsync signal to Lo level again and receives display information of the next scan line.

A series of communication operations described above are repeated to complete a write operation on the display panel and a partial write operation.

(4) Operation in Display Mode Setup
--Setup from Host Side-Setup--

Figure 6:
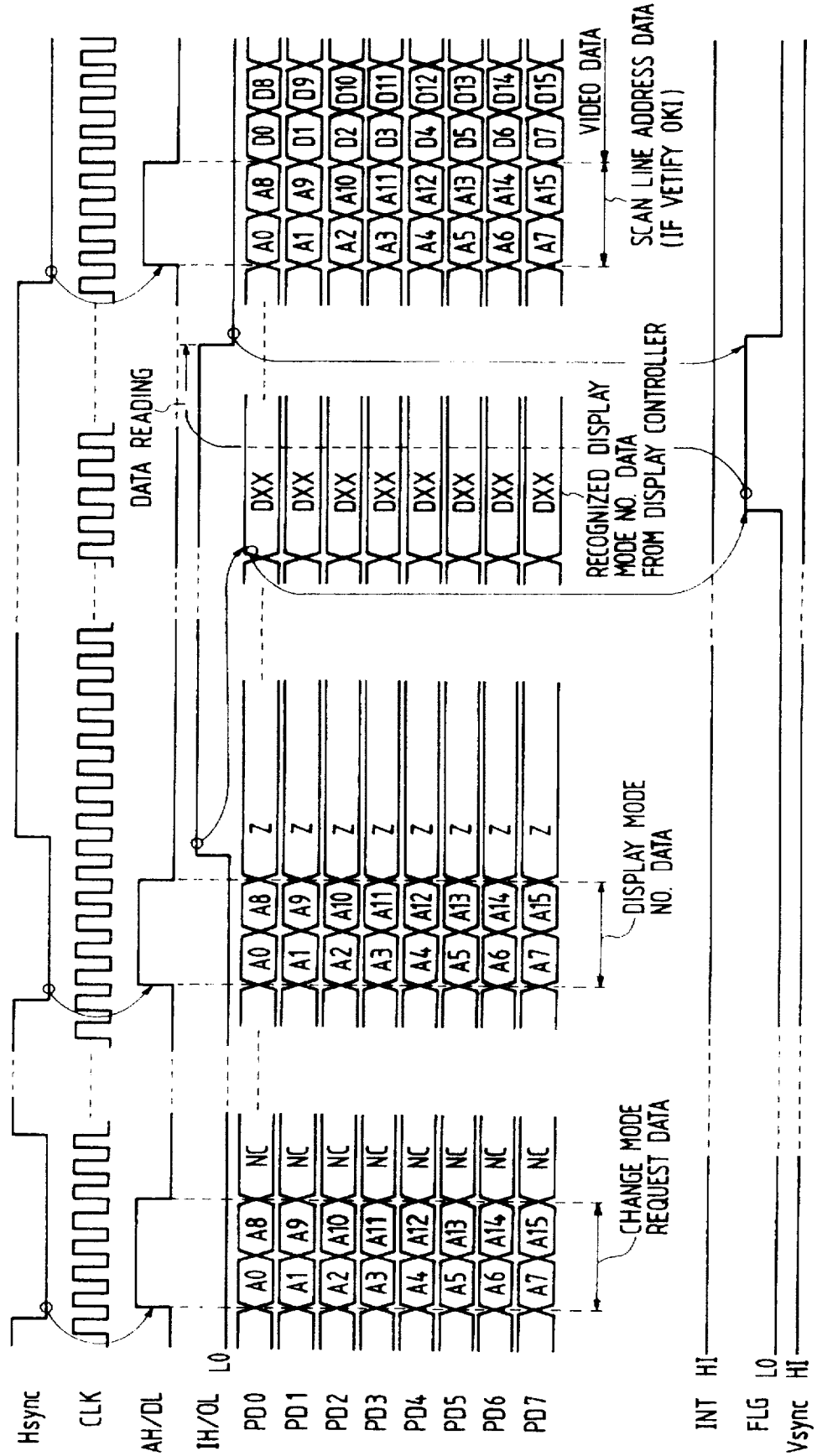

Setup and updating of a display mode on the display apparatus are basically based on requests from the host side and basically comply with the timing chart of FIG. 6.

① When a display mode change request from the CPU 11 side is detected, the graphic controller 9 superposes "display mode change request data" on a drive information component (AH/DL line of Hi level, i.e., timings of A0 to A15 in FIG. 6) of display information transferred to the controller 8 in the display unit 1.

② The controller 8 in the display unit 1 recognizes the predetermined "display mode change request data" and sets the Hsync line to Lo level.

③ The graphic controller 9 sends a "display mode number" as the next drive information to the controller 8 in the display unit 1 at the timings of A0 to A15 and sets the IH/OL signal to Hi level, thereby switching the data bus (PH0–PD7) to the input mode.

④ The controller 8 in the display unit 1 receives the "display mode number", determines display panel drive conditions, determines a relationship between the physical pixel number and the logical pixel number, and/or a relationship between the colors and the gradation level number, determines the size of an effective display screen and the size of an outer frame of the display screen, determines a relationship between colors in the outer frame and/or a relationship between gradation level numbers in the outer frame, and determines a transfer format and/or timing of information sent from the image information storage to the display apparatus in accordance with the display mode represented by the "display mode number". In addition, in order to verify whether communication is normal, after the IH/OL line of Hi level is verified, the input "display mode number" is sent onto the data bus (PD0–PD7), and the FLG signal is set at Hi level.

⑤ After the graphic controller 9 verifies that the FLG line is set at Hi level, the graphic controller 9 stores the "display mode number" data output onto the data bus (PD0–PD7) in the GCPU 14.

⑥ The GCPU 14 compares the received data with the previously transferred "display mode number" and performs verification. Thereafter, the GCPU 14 sets the IH/OL signal to Lo level.

⑦ After the controller 8 in the display unit 1 verifies that the IH/OL line is set at Lo level, the controller 8 sets the Hsync line to Lo level and waits for the next display information.

⑧ After the graphic controller 9 verifies that the Hsync line is set at Lo level, the controller 9 sends the normal {(scan line address)+(video information)} if the verification result represents a normal state. However, if the verification result represents an abnormal state, "display mode conversion request data" is sent again, and the operations are restarted from procedure ①.

The display mode can be changed and the display panel in each designated display mode can be driven in accordance with the above procedures.

(5) Operation of Display Mode Setup
--Setup from Display Side--

When power sources of the graphic controller 9 and the controller 8 of the display unit 1 are independent from each other and the controller 8 in the display unit 1 is powered after the graphic controller 9 (host side) is powered, the controller 8 in the display unit 1 cannot detect a current display mode of the graphic controller 9. In this case, the controller 8 in the display unit 1 sends an INT signal to the graphic controller 9 and requests setup of a display mode. When the graphic controller 9 receives the INT signal from the display unit controller 8, the graphic controller 9 sends display mode change request data to the display unit controller 8.

The subsequent operations are the same as the procedures as in "--Setup from Host Side-- of (4) Operation in Display Mode Setup" so as to set a display mode.

It is also possible to send a read request from the display apparatus to the host apparatus as needed. In this case, as in the setup of the display mode, the display apparatus sends an INT signal to the graphic controller 9 first. Upon reception of the INT signal from the display apparatus, the graphic controller 9 sends display mode change data to the display unit controller 8. The subsequent operations are the same as the procedures as in generation of a request from the host apparatus, thereby performing read processing of the temperature information.

Figure 2B:
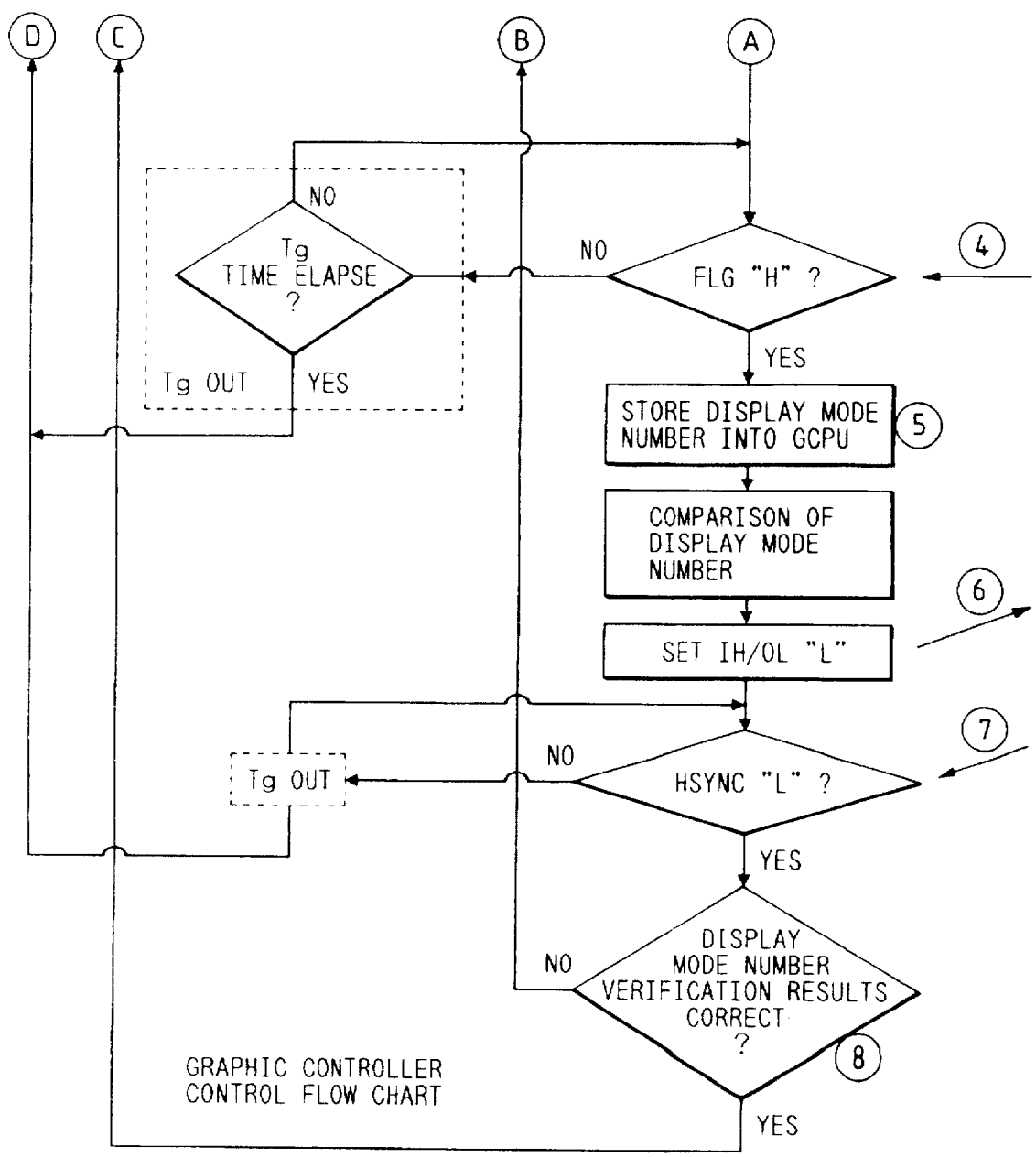
Figure 2C:
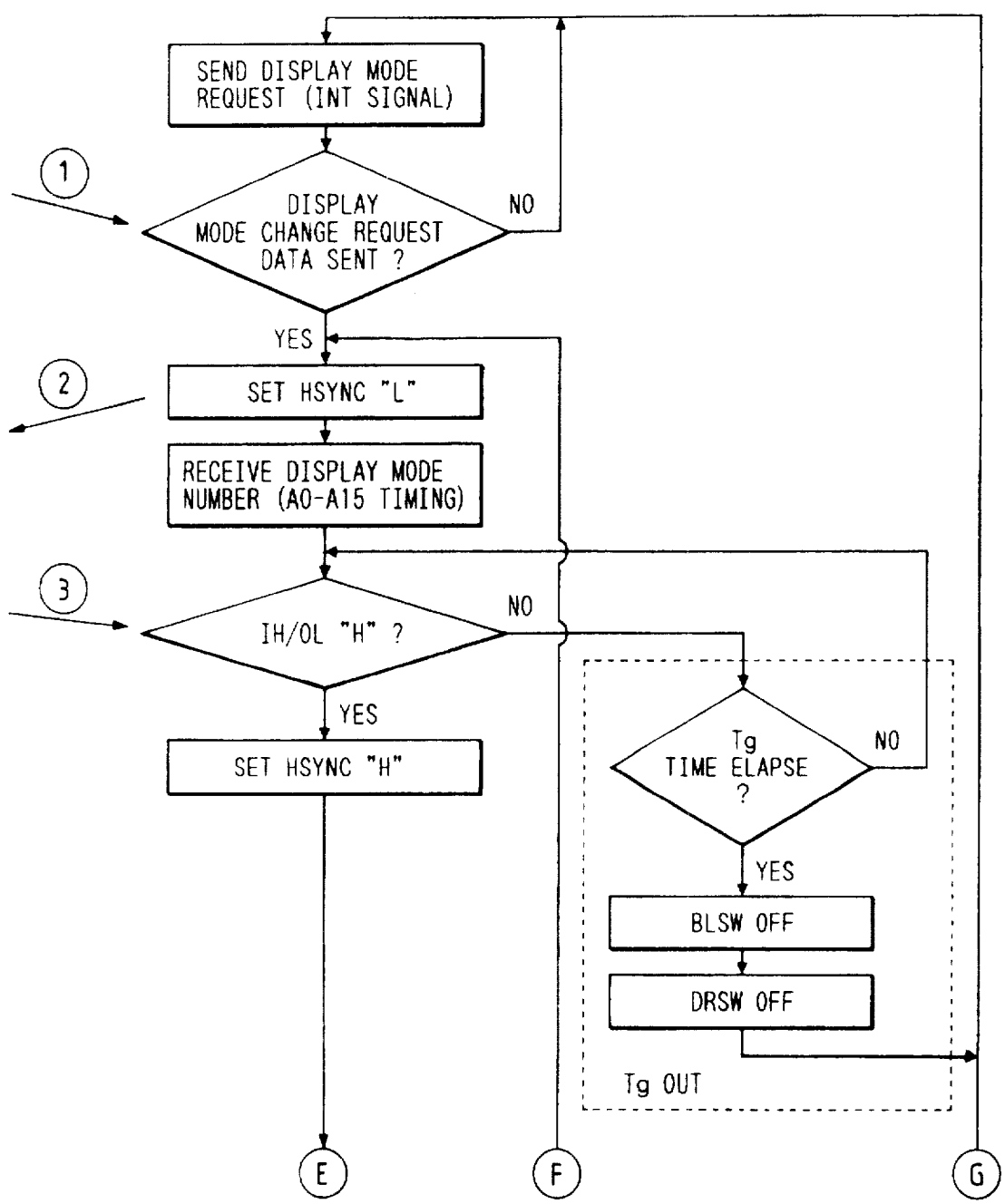
Figure 2D:
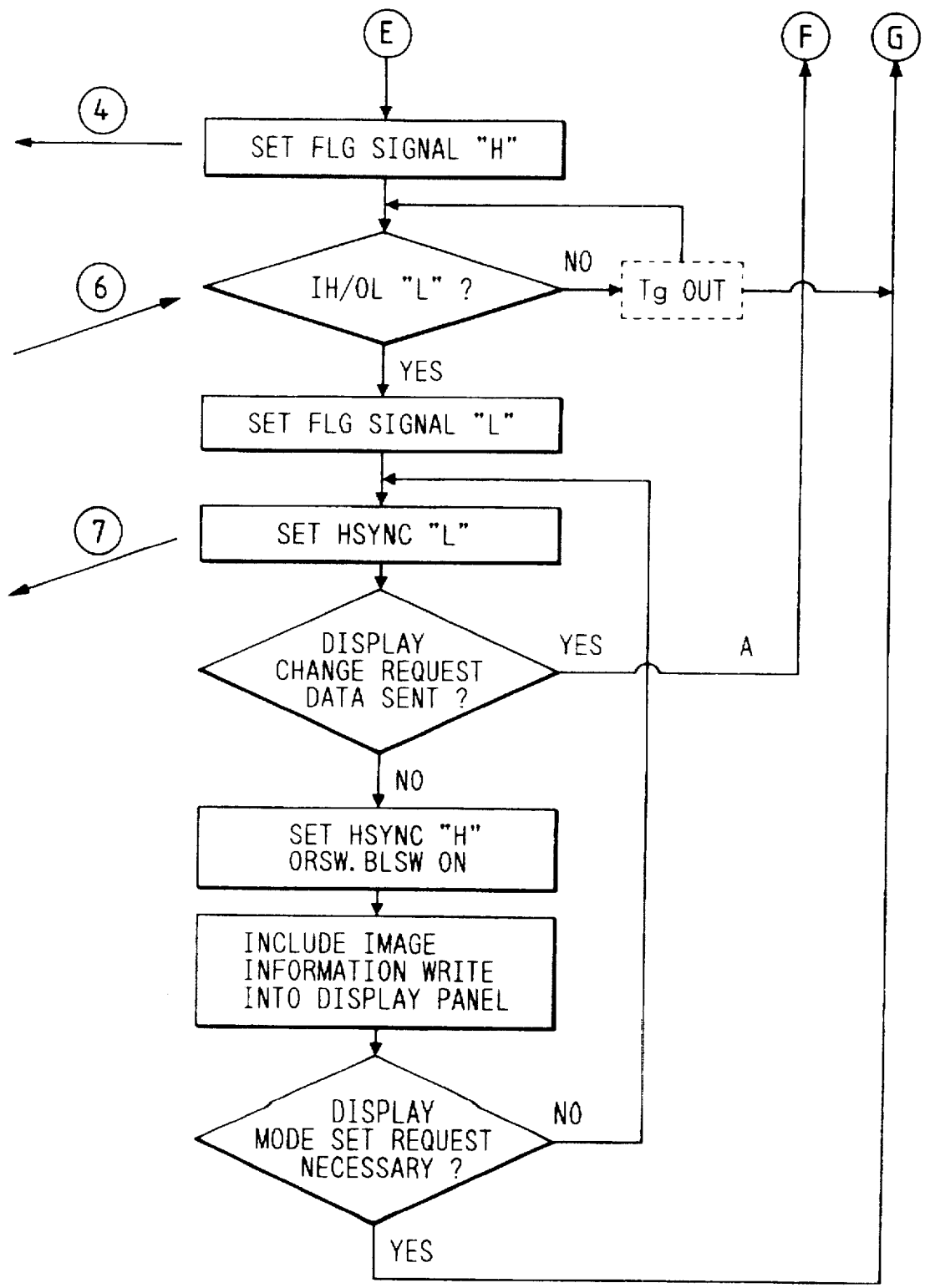

In the above communication sequence, control to be performed upon reception of external noise to a communication control line (i.e., a signal line shown in (1)) or upon opening or short-circuiting of the control line during communication control will be described, and its control flow chart is shown in FIG. 2. A graphic controller control program in FIG. 2 is stored in the BIOS ROM 13. A display unit controller control program is stored in a memory element in the display unit controller 8. Numerals ① to ⑧ in the handshake communication part in FIG. 2 correspond to the procedure numbers in "(4) Display Mode Setup".

The following description is the characteristic part of the present invention.

"(4) Operation of Display Mode Setup" will be exemplified. When a display mode is to be changed in response to a request from the host side, the graphic controller 9 performs handshake communication with the display controller 8 in an order of procedures ①, ②, ③, . . . of (4) and controls the display panel. In the state of the procedure ⑧, assume that the graphic controller 9 determines that the verification result is correct and sends image information (scan address signal) to the display unit controller 8. At this time, assume that external noise is input to the control bus (PD0-PD7) and that the display unit controller 8 erroneously receives image data (scan address signal) as display mode change request data. The display unit controller 8 immediately sets the Hsync signal to "L" level in a route A in FIG. 3. The display unit controller 8 receives a display mode number from the graphic controller 9 (this display mode number is not correct). The display unit controller 8 then waits until the IH/OL signal goes to "H" level. Meanwhile, after the graphic controller 9 sends image information, it verifies that the next Hsync signal is set at "L" level and sends the next image information. The graphic controller 9 repeats a loop B in FIG. 2.

When TgOUT and TDout functions in FIG. 2 are not used (Tg and Td times are to be set infinite), the display unit controller 8 waits until the IH/OL signal goes to "H" level and does not write image information in the display panel 1. If Td=several 100 ms as a finite time is set, the display unit controller 8 turns off the back light 13 in response to a BLSW signal when a Td time (i.e., several 100 ms) elapses. The display drivers 3 and 4 are turned off in response to a DRSW signal. The display unit controller 8 then sends an INT signal to the graphic controller 9. Upon verification of the INT signal, the graphic controller 9 starts communication again in accordance with the communication sequence of (4), so that normal control is restored.

An operation performed while the IH/OL signal line is opened during communication control of (4) will be described below. In this state, in the state of procedure ③ of (4), the display unit controller 8 keeps waiting until the IH/OL signal goes to "H" level. For this reason, as the FLG signal for the next processing cannot be set to "H" level, the graphic controller 9 also waits until the FLG signal goes to "H" level.

If condition Tg<Td=several 100 ms is established, the graphic controller 9 ends handshake communication when the Tg time elapses. Processing of the loop B is performed. For this reason, the graphic controller 9 can receive an INT signal from the display unit controller 8. On the other hand, when the Td time (i.e., several 100 ms) elapses, the display unit controller 8 turns off the back light 13 in the display unit 1 and disables the display drivers 3 and 4. The display unit controller 8 then outputs an INT signal. When the open state of the IH/OH signal line is returned to a normal state, a normal drive operation is restored. During this period, the driver power applied to the display panel 1 and the back light are kept off.

The Tg and Td time setup operations are realized by software counters in the respective controllers. This may be, however, realized such that external hardware counters are arranged outside the GCPU 4 and the display unit controller 8, and set values of these counters may be controlled. At this time, signal lines for coincidence between the count values and the preset time counts are connected to the GCPU 4 and the display unit controller 8.

(6) Operation of Scan Mode Setup Corresponding to Temperature Information

In order to cause the host side to detect temperature information of the display unit 1 and set a scan mode corresponding to the temperature information, a basic method of causing the graphic controller 9 to read temperature information as part of display information from the controller 8 in the FLC display unit 1 is utilized. A detailed operation will be described below.

① The graphic controller 9 superposes "temperature information read request data" on drive information part (when the AH/DL line is set at Hi level) at the time of display information transfer to the display apparatus, and sets the IH/OL signal to Hi level, thereby switching the data bus (PD0-PD7) to the input mode.

② After the controller 8 in the display unit 1 verifies the predetermined "temperature information read request data" and the IH/OL line as Hi level, the controller 8 sends "temperature data" onto the data bus (PD0-PD7) and sets the FLG signal to Hi level.

③ After the graphic controller 9 verifies that the FLG line is set at Hi level, it stores the "temperature data" on the data bus (PD0-PD7) in the GCPU 14.

④ The GCPU 14 sets a scan mode of the display panel on the basis of the input "temperature data".

It is possible to output a set-change request of a scan mode from the display side to the host side in accordance with a change in environmental temperature of the display panel. In this case, the display apparatus sends an INT signal to the graphic controller 9 as in setup of the display mode. Upon reception of the INT signal from the display side, the graphic controller 9 checks the FLG line. If the FLG line is set at Hi level, the graphic controller 9 verifies that the INT signal represents a temperature information read request. Thereafter, the temperature information read operations and the scan mode setup operations are performed in the same manner as that upon generation of a request from the host side.

Figures 3, 11:
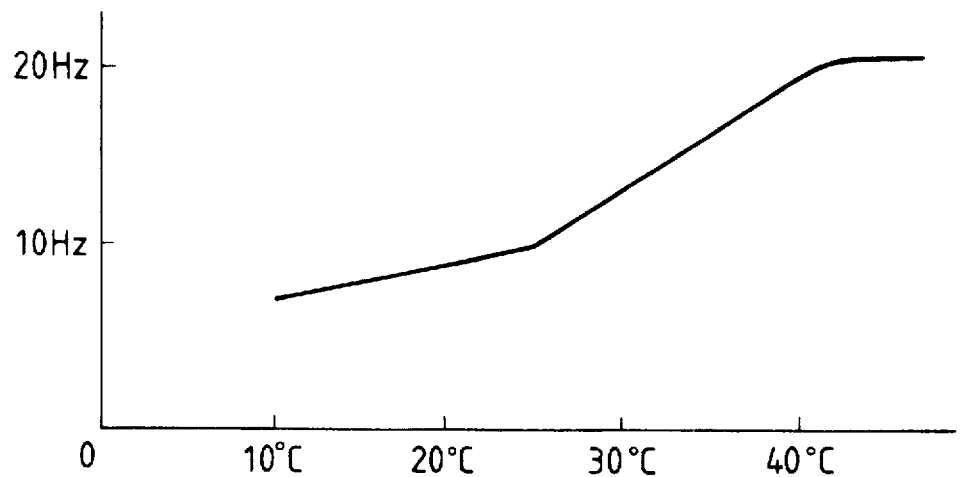
FIG. 3 is a graph showing temperature dependency of drive conditions (frequency) as a function of the temperature in a ferroelectric liquid crystal apparatus used in the present invention.
FIG. 11 is a view showing a relationship between physical and logic pixels in a display unit of the ferroelectric liquid crystal display apparatus according to the present invention.

Table 2 (FIG. 8) shows adapter names for supporting "1 Alphanumeric Mode 2" and "2 Graphics Mode" in the IBM mode, resolutions, colors, and the gradation level numbers, and FLC display drive information. A ratio "b/p" in Table 2 is used to determine the colors and gradation level numbers in the output information in response to the input information and represents the number of bits representing binary colors and binary gradation level information amount of each pixel (one logic pixel) in a video data format developed in the video image storage memory VRAM 10 in FIG. 1. An expression "ratio" in Table 2 represents a relationship between a physical pixel number and a logic pixel number. This relationship is shown in FIG. 11. The FLC display in this embodiment has physical pixels having two different area ratios as a pixel unit. Condition of ratio=1 represents a one minimum logic pixel arrangement, and a maximum gradation level number is 4 (The FLC display is basically a binary display, and a multivalue display by using this FLC display, i.e., a method of realizing multi-level display is proposed as a method using physical pixels having two different area ratios as one pixel unit). Condition of ratio=2 represents four physical pixels, so that one logic pixel is constituted by two minimum pixel units, and the gradation level number is 8. Similarly, condition of ratio=4 represents eight physical pixels, so that one logic pixel is constituted by four minimum pixel units and the gradation level number is 16.

Figure 9:
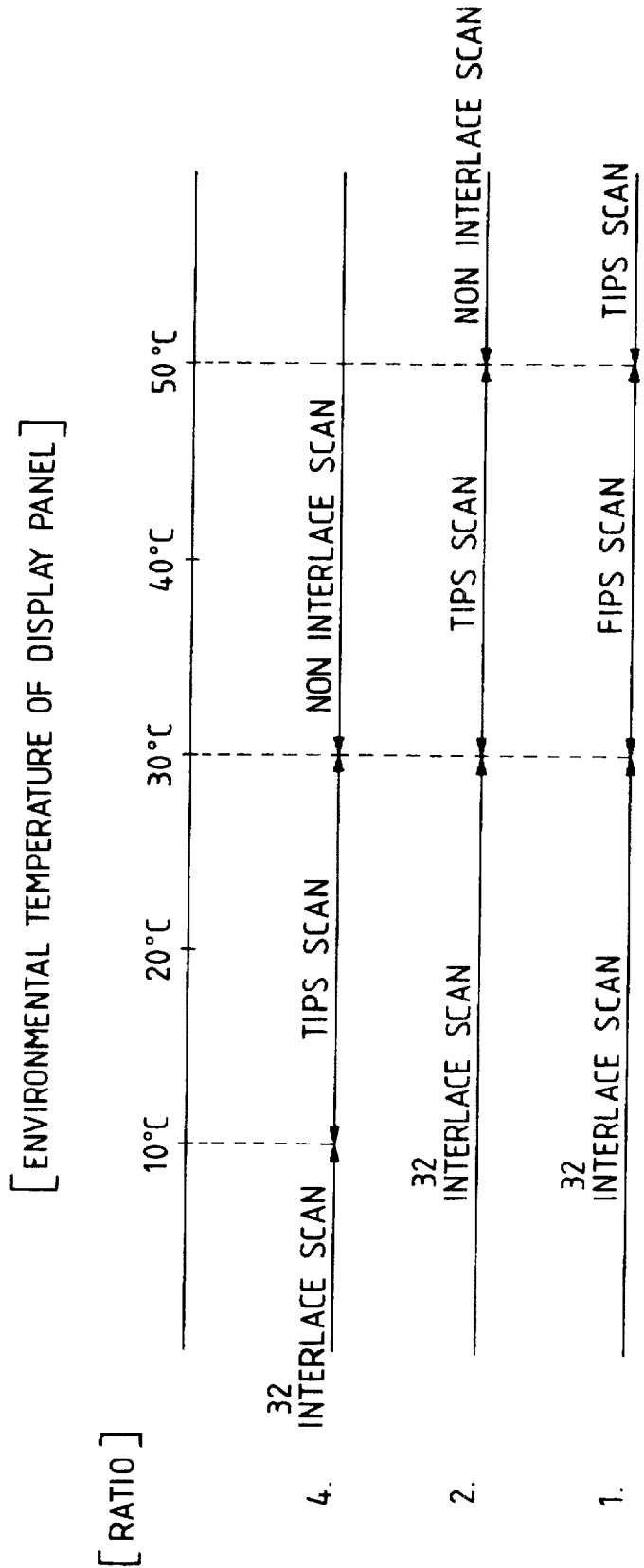
FIG. 9 is a view showing a relationship between an environmental temperature of a display panel and a scan mode in units of ratios.

FIG. 9 shows a relationship between the environmental temperature of the display panel and the scan mode. Different modes can be set in accordance with different ratios. An interlace width in a scan mode can be reduced (=improvement of display quality of motion image) when the value of the ratio is increased even if the environmental temperature is kept unchanged.

The scan mode in FIG. 9 is designed to optimize prevention effects of the screen discontinuation phenomenon in the motion image display state and flickering depending on the frame frequency in accordance with the ratio and the environmental temperature of the display panel.

The specifications (scan order of the display panel) of the respective scan modes are shown in FIG. 10. A scan sequence in each scan mode will be briefly described below.

(A) Interlace Scan—FIG. 10A: All scan lines are sequentially selected from the top to the bottom on the display screen. This scan method is best in display quality of the motion image.

(B) 32 Interlace Scan—FIG. 10B: Scan lines are selected every 32 lines. One frame consists of 32 fields, and an order of fields is selected at random.

(C) Tips Scan—FIG. 10C: All the scan lines are divided into a plurality of blocks, and the blocks are sequentially selected. A 2 interlace scan operation is performed in each block. When a given block is compared with the next block in units of blocks, scan start positions are selected to be different from each other. One frame consists of two fields. In Table 4, 1,024 scan lines are divided into 16 blocks in units of 64 scan lines, and the 16 blocks are sequentially selected.

(D) Fips Scan—FIG. 10D: As in the Tips scan, all the scan lines are divided into a plurality of blocks, and the blocks are sequentially selected. A 4 interlace scan operation is performed in each block. When a given block is compared with the next block in units of blocks, scan start positions are selected to be different from each other. One frame consists of four fields. In Table 4, 1,024 scan lines are divided into 8 blocks in units of 128 scan lines, and the 8 blocks are sequentially selected.

As has been described above, according to the present invention, the means for forcibly interrupting the communication control means, the means for arbitrarily changing the interruption timing, and the means for performing communication control again are arranged in the communication control program stored in the prestored ROM BIOS 13 and in a program in the display unit controller 8. Even if a data reception error caused by external noise or an operation error caused by open and short-circuiting states of the communication control line occurs, it is possible to normally transfer image information without resetting the host CPU. This indicates that host CPU information -processed until an operation error caused by a host CPU reset operation will not be broken.

Until operations errors are eliminated, the power sources for the display drivers 3 and 4 and the back light 13 can be controlled to be kept off. Therefore, a "burning" phenomenon can be prevented.

Any one of the various display modes is used from the power-ON timing, and a systematic control method indispensable to change the display mode as needed is stored in the ROM. A control monitor unit capable of further changing the display mode from the host side, as needed, in accordance with a predetermined sequence is provided so that demand for supporting various display modes such as MultiSync display modes can be satisfied by using a ferroelectric liquid crystal display apparatus requiring drive information control which could not be performed by a conventional method due to different drive principles.

In addition to the ferroelectric liquid crystal, the present invention is apparently effective for a display apparatus wherein scan and information signal electrodes are sandwiched between the matrix electrodes, and scan and information signals are applied to drive the apparatus having a memory function and temperature dependency in drive conditions.

What is claimed is:

1. A display apparatus comprising:

a display panel provided with scanning signal electrodes and information signal electrodes arranged in a matrix array and sandwiching therebetween a liquid crystal with a memory function;

driving means for supplying said scanning signal electrodes with a scanning signal and supplying said information signal electrodes with an information signal;

first control means for designating, according to an ambient temperature, either one of a first scanning mode of non-interlace scanning of said scanning signal electrodes, a second scanning mode of interlace scanning with a predetermined interlace width of said scanning signal electrodes to be scanned in a single vertical scanning time period, and a third scanning mode wherein the scanning signal electrodes are divided into a plurality of blocks, with the blocks sequentially selected and said scanning signal electrodes in a single block being subjected to the interlace scanning with the predetermined interlace width; and second control means for controlling said driving means to scan said scanning signal electrodes based on the designated scanning mode, wherein the interlace width of the third scanning mode is set at a value which decreases as the ambient temperature increases.

2. An apparatus according to claim 1, wherein said liquid crystal is a ferroelectric liquid crystal.

3. A display apparatus comprising:

a display panel provided with scanning signal electrodes and information signal electrodes arranged in a matrix array and sandwiching therebetween a liquid crystal with a memory function;

driving means for supplying said scanning signal electrodes with a scanning signal and for supplying said information signal electrodes with an information signal;

first control means for designating either one of, according to a number of gradations, a first scanning mode of non-interlace scanning of said scanning signal electrodes, or a second scanning mode of interlace scanning of said scanning signal electrodes in a predetermined interlace width; and second control means for controlling said driving means to scan the scanning signal electrodes based on the designated scanning mode.

4. An apparatus according to claim 3, wherein said liquid crystal is a ferroelectric liquid crystal.

5. An apparatus according to claim 3, wherein the interlace width of the second scanning mode is set at a value which decreases as a temperature of said display panel increases.

* * * * *

UNITED STATES PATENT AND TRADEMARK OFFICE
CERTIFICATE OF CORRECTION

PATENT NO. : 5,754,153
DATED : May 19, 1998
INVENTOR(S) : Mizutome et al.

It is certified that error appears in the above-identified patent and that said Letters Patent is hereby corrected as shown below:

In the drawings:

SHEET 9:

"VETIFY OK1" should read --VERIFY OK--.

SHEET 10:

"PROGRAMED" should read --PROGRAMMED-- and "Machintosh" should read --Macintosh--.

COLUMN 8:

Line 17, "Side-Setup--" should read --Side-- --.

COLUMN 12:

Line 25, "-processed" should read --processed--.

Signed and Sealed this

Fourth Day of May, 1999

Attest:

Q. TODD DICKINSON

*Attesting Officer*     *Acting Commissioner of Patents and Trademarks*